US012624657B2

(12) United States Patent
Christos et al.

(10) Patent No.: US 12,624,657 B2
(45) Date of Patent: May 12, 2026

(54) ENERGY GENERATING SYSTEM

(71) Applicant: Green Current (Pty) Ltd, Midrand (ZA)

(72) Inventors: Christe SJ Christos, Johannesburg (ZA); Lyle Lawrence Ireland, Dalview (ZA)

(73) Assignee: Green Current (Pty) Ltd, Midrand (ZA)

( * ) Notice: Subject to any disclaimer, the term of this patent is extended or adjusted under 35 U.S.C. 154(b) by 0 days.

(21) Appl. No.: 18/880,148

(22) PCT Filed: Jul. 18, 2023

(86) PCT No.: PCT/ZA2023/050037
§ 371 (c)(1),
(2) Date: Dec. 30, 2024

(87) PCT Pub. No.: WO2024/020605
PCT Pub. Date: Jan. 25, 2024

(65) Prior Publication Data
US 2025/0334070 A1 Oct. 30, 2025

(30) Foreign Application Priority Data
Jul. 21, 2022 (ZA) .................................. 202208118

(51) Int. Cl.
*F02C 3/32* (2006.01)
*F02C 3/04* (2006.01)
(52) U.S. Cl.
CPC .................. *F02C 3/32* (2013.01); *F02C 3/04* (2013.01); *F05D 2220/76* (2013.01); *F05D 2240/24* (2013.01)

(58) Field of Classification Search
CPC .......... F02C 3/04; F02C 3/32; F05D 2220/76; F05D 2240/24; F01N 2260/06; F01N 2270/08; F01N 13/082; F03D 1/041
See application file for complete search history.

(56) References Cited

U.S. PATENT DOCUMENTS 3,678,690 A * 7/1972 Shohet ...................... F02K 3/06
60/226.3
4,051,671 A 10/1977 Brewer
(Continued)

FOREIGN PATENT DOCUMENTS

CN 108266233 B 9/2023
WO 9737112 A1 10/1997
(Continued)

OTHER PUBLICATIONS

"International Search Report and Written Opinion", mailed on Oct. 12, 2023 in International Application No. PCT/ZA2023/050037, 11.

*Primary Examiner* — Loren C Edwards
(74) *Attorney, Agent, or Firm* — Billion & Armitage

(57) ABSTRACT

An energy generating system (10) includes: (i) a first conduit (14) for conveying air there along, which first conduit defines: a first conduit inlet for receiving air; and a first conduit outlet (14a) for discharging air; (ii) a turbine rotor (22); (iii) a turbine housing (20) radially surrounding the turbine rotor; and (iv) an exhaust conduit (18) that extends from the turbine housing to convey air discharged from the turbine rotor. The turbine housing and first conduit define an annular gap (24) therebetween; and the turbine rotor is: (a) disposed within the annular gap defined between the turbine housing and the first conduit; and (b) rotatably secured to the first conduit.

9 Claims, 2 Drawing Sheets

(56)          References Cited

U.S. PATENT DOCUMENTS 6,467,725  B1 *  10/2002  Coles ...................... F01D 15/10
                                                            244/58
2009/0145135  A1     6/2009  Roberge

FOREIGN PATENT DOCUMENTS

WO          2008020758  A1     2/2008
WO          2009099399  A1     8/2009

* cited by examiner

ENERGY GENERATING SYSTEM

BACKGROUND

The present invention relates to an energy generating system. More specifically, the present invention relates to an energy generating system including a turbine and a depressurising device for maintaining a negative pressure downstream of the turbine.

Various energy generating systems that include a turbine and a depressurising device are known. For example:

WO2009/099399 "Vacuum creating exhaust muffler for internal combustion engines" describes an expansion chamber in the exhaust conduit downstream of a turbine and a venturi for reducing the pressure within the expansion chamber, thereby further to muffle noise within the exhaust conduit;

CN108266233 describes a steam turbine with a vacuum generating device disposed downstream of the turbine that, in use, increases the pressure differential across the turbine, thereby to draw water droplets away from the turbine blades when the steam pressure at the turbine inlet is low; and WO97/37112 "Negative pressure turbine power generating device by an internal combustion engine" describes a turbine and an internal combustion engine with a venturi disposed along the internal combustion engine exhaust that induces a negative pressure downstream of the turbine.

A drawback of known systems is that they do not maximise the pressure differential across the turbine (i.e. between the operative upstream end of the turbine and the operative downstream end of the turbine). It is an object of the present invention to address this drawback.

SUMMARY OF THE INVENTION

According to a preferred embodiment of the invention, there is provided an energy generating system that includes:
- a first conduit for conveying air there along, which first conduit defines:
  - a first conduit inlet for receiving air; and
  - a first conduit outlet for discharging air;
- a turbine rotor;
- a turbine housing radially surrounding the turbine rotor; and
- an exhaust conduit that extends from the turbine housing to convey air discharged from the turbine rotor, characterised in that:
- the turbine housing and first conduit define an annular gap therebetween; and
- the turbine rotor is:
  - disposed within the annular gap defined between the turbine housing and the first conduit; and
  - rotatably secured to the first conduit.

Typically:
- the turbine housing, turbine rotor and first conduit are coaxial; and
- a first axial end of the turbine housing does not extend to the first conduit, thereby to define an annular inlet operatively upstream of the turbine rotor.

Generally:
- the turbine rotor is disposed on the first conduit between the annular inlet and the first conduit outlet;
- the turbine rotor is axially spaced from the annular inlet by less than 50 cm; and the turbine rotor is axially spaced from the first conduit outlet by less than ([the radius of the turbine housing]× 0.5).

Preferably, the energy system according to claim 3, wherein the annular inlet is axially spaced from the first conduit outlet by less than (50 cm+[(the radius of the turbine housing)×0.5]+[the axial length of the turbine rotor]).

Typically, the exhaust conduit extends from a second axial end of the turbine housing, axially away from the turbine housing.

Generally, the exhaust conduit extends over and beyond the first conduit outlet.

Preferably both the first conduit and the exhaust conduit are circular in axial cross-section and co-axial.

Typically, the energy generating system further includes a compressor or blower for conveying air along the first conduit.

Generally, the energy generating system further includes a generator coupled to the turbine rotor.

BRIEF DESCRIPTION OF THE DRAWINGS

The invention will now be described in more detail, by way of examples only, with reference to the accompanying drawings in which.

DESCRIPTION OF THE INVENTION

Figure 1:
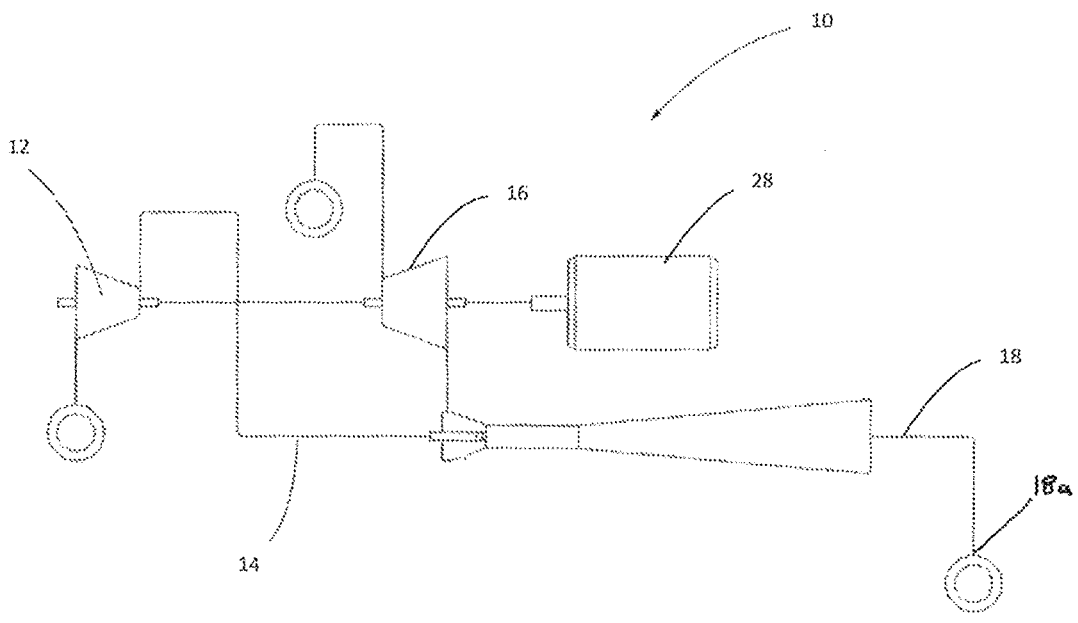
FIG. 1 is a schematic diagram showing an energy generating system according to a preferred embodiment of the invention.

With reference to the Figures, an energy generating system 10 according to a preferred embodiment of the invention includes: a blower or compressor 12; a first conduit 14; a turbine 16 and an exhaust conduit 18.

The blower or compressor 12 could comprise a fan, an exhaust of an internal combustion engine, an air compressor or the like.

Figure 2:
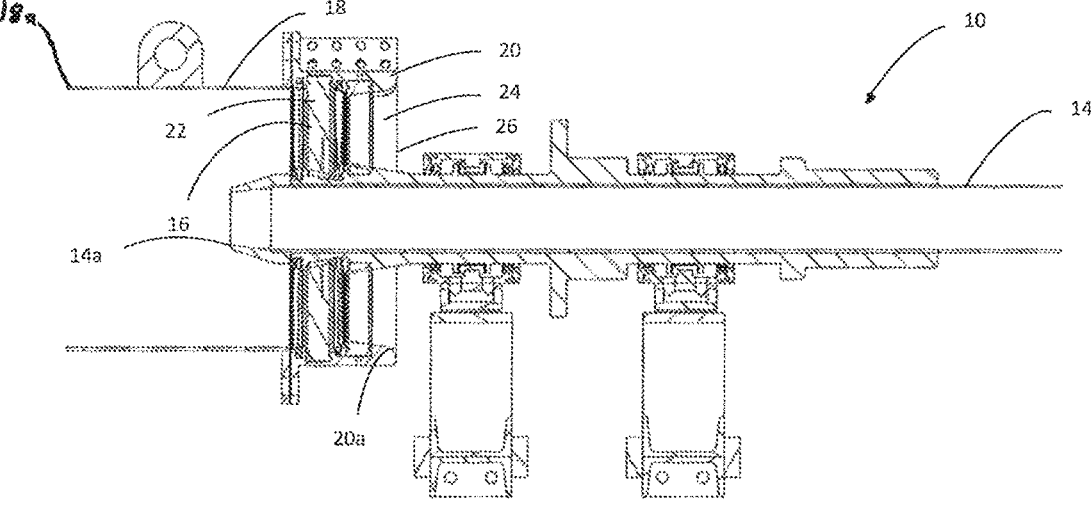
FIG. 2 is a cross-sectional view of the turbine in FIG. 1.
Figure 3:
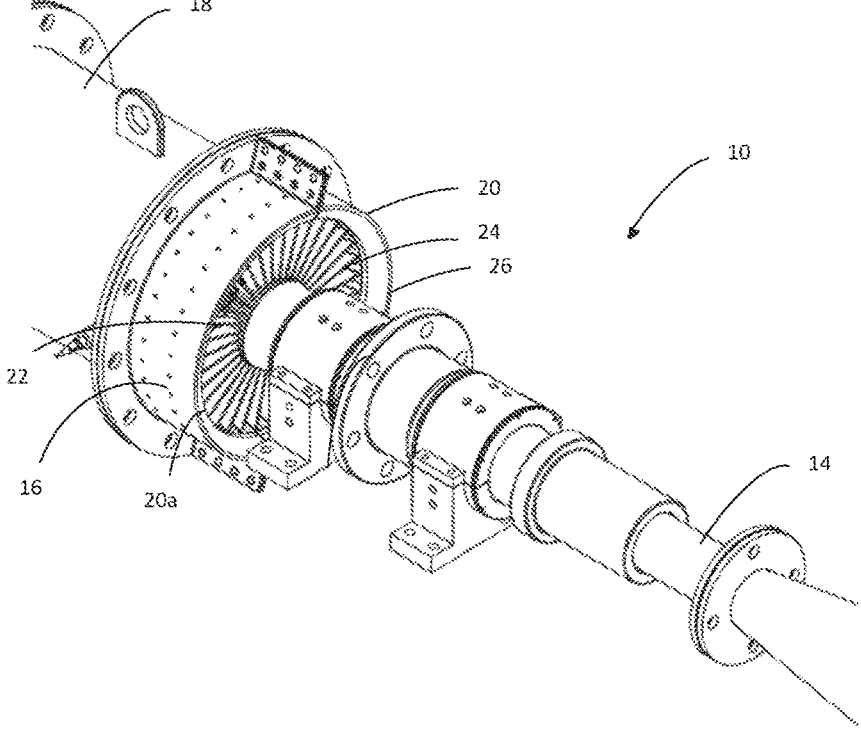
FIG. 3 is an isometric view of the turbine in FIG. 1.

The first conduit 14 is circular in axial cross-section and extends from the blower or compressor 12. In use, the first conduit 14 receives air from the blower or compressor 12 via a first conduit 14 inlet, conveys the air there along and discharges the air via a first conduit outlet 14a. FIG. 2 show the first conduit 14 defining a first axial portion that taper from the first conduit 14 inlet and a second axial portion proximal the first conduit outlet 14a that is right circular cylindrical.

The turbine 16 comprises a turbine housing 20 and a turbine rotor 22.

The turbine housing 20 is generally right circular cylindrical, receives the first conduit 14 therethrough, is co-axial with the first conduit 14 and is diametrically oversized relative to the first conduit 14 to define an annular gap 24 between the turbine housing 20 and the first conduit 14.

The turbine rotor 22 comprises a plurality of vanes and is rotatably secured to the first conduit 14. More specifically: the turbine rotor 22 is journaled to the radial outer surface of the first conduit 14 along the right circular cylindrical second axial portion of the first conduit 14; and is coaxial with the first conduit 14. The turbine rotor 22 is radially surrounded by the turbine housing 20, and is disposed within the annular gap 24 defined between the turbine housing 20 and the first conduit 14.

A first axial end 20*a* of the turbine housing 20 does not extend to the first conduit 14, thereby to define an annular inlet 26 operatively upstream of the turbine rotor 22. In use, ambient air (i.e. air at atmospheric pressure) enters the turbine 16 via the annular inlet 26. Optionally the first axial end 20*a* of the turbine housing may be flared to facilitate flow of ambient air into the annular inlet 26.

In use, to create a suitable pressure differential across the turbine 16:

the turbine rotor 22 is disposed on the first conduit 14, between the annular inlet 26 and the first conduit outlet 14*a*;

the turbine rotor 22 is axially spaced from the annular inlet 26 by less than 50 cm. In clarification of the aforegoing, this measurement represents the axial spacing from the annular inlet 26 to the turbine rotor 22 vane proximal the annular inlet 26;

the turbine rotor 22 is axially spaced from the first conduit outlet 14*a* by less than ([the radius of the turbine housing 20]×0.5). In clarification of the aforegoing, this measurement represents the axial spacing from the first conduit outlet 14*a* to the turbine rotor 22 vane proximal the first conduit outlet 14*a*; and the annular inlet 26 is axially spaced from the first conduit outlet 14*a* by less than:

$$50 \text{ cm} + [(\text{the radius of the turbine housing}) \times 0.5] + [\text{the axial length of the turbine rotor}]).$$

FIG. 1 shows the turbine 16 mechanically linked to the compressor or blower 12. However, such link is optional. FIG. 1 also shows the turbine 16 mechanically linked to a generator 28 for converting rotation of the turbine rotor 22 into electrical energy.

The exhaust conduit 18 is circular in axial cross-section, is coaxial with the first conduit 14 and extends from the turbine housing 20. More specifically, the exhaust conduit 18 extends from a second axial end of the turbine housing 20, axially away from the turbine housing 20, over and beyond the first conduit outlet 14. Although, described as two separate components, it will be appreciated that the turbine housing 20 and exhaust conduit 18 may be integrally formed (e.g. formed as a single tube).

In use, the exhaust conduit 18 conveys air discharged from the turbine rotor 22 and air discharged from the first conduit outlet 14*a* along the exhaust conduit 18 and discharges such conveyed air via the exhaust conduit outlet 18*a*. To facilitate movement of air there along, the exhaust conduit 18 flares towards the exhaust conduit outlet 18*a*.

In use:

The blower/compressor 12 creates airflow along the first conduit 14.

Discharge of air via the first conduit outlet 14*a* creates a negative pressure in the region between the first conduit outlet 14*a* and the second axial end of the turbine housing 20, which, in turn, causes ambient air to flow into the turbine 16 via the annular inlet 26, past the turbine rotor 22.

Air discharged from the turbine rotor 22 and from the first conduit outlet 14*a* is conveyed along the exhaust conduit 18 before it is vented into the atmosphere.

It will be appreciated that, in use, the turbine rotor 22 is induced to rotate by both:

flow of air from past the turbine rotor 22; and the pressure differential across the turbine (i.e. the negative pressure induced in the region between: (i) the first conduit outlet 14*a* and the second axial end of the turbine housing 20, operatively downstream of the turbine rotor 22; and (ii) the ambient atmospheric pressure at the annular inlet 26 operatively upstream of the turbine rotor 22.

The invention claimed is:

1. An energy generating system (10) including:

a compressor or a blower;

a first conduit (14) that:

extends from the compressor or blower and is in fluid communication with the compressor or the blower for conveying air discharged from the compressor or the blower; and defines:

a first conduit inlet for receiving the air from the compressor or the blower; and a first conduit outlet (14*a*) for discharging the air received from the compressor or the blower;

a turbine rotor (22);

a turbine housing (20) radially surrounding the turbine rotor; and an exhaust conduit (18) that extends from the turbine housing, characterised in that:

the turbine housing and the first conduit define an annular gap (24) therebetween;

the turbine rotor is:

disposed within the annular gap defined between the turbine housing and the first conduit; and rotatably secured to the first conduit, wherein a first axial end (20*a*) of the turbine housing and the first conduit together define an annular inlet operatively upstream of the turbine rotor;

the first axial end of the turbine housing is spaced from and does not extend to the compressor or the blower, in use, to receive ambient air into the turbine housing; and the energy generating system being configured such that the air discharged from the first conduit outlet and the ambient air discharged from the turbine rotor is conveyed along the exhaust conduit, thereby, in use to create a pressure differential across the turbine rotor.

2. The energy generating system according to claim 1, wherein: the turbine housing, the turbine rotor and the first conduit are coaxial.

3. The energy generating system according to claim 2, wherein:

the turbine rotor is disposed on the first conduit between the annular inlet and the first conduit outlet;

the turbine rotor is axially spaced from the annular inlet by less than 50 cm; and the turbine rotor is axially spaced from the first conduit outlet by less than ([a radius of the turbine housing]× 0.5).

4. The energy generating system according to claim 3, wherein the annular inlet is axially spaced from the first conduit outlet by less than (50 cm+[(the radius of the turbine housing)×0.5]+[an axial length of the turbine rotor]).

5. The energy generating system according to claim 4, wherein the exhaust conduit extends from a second axial end of the turbine housing, axially away from the turbine housing.

6. The energy generating system according to claim 5, wherein the exhaust conduit extends over and beyond the first conduit outlet.

7. The energy generating system according to claim 6, wherein both the first conduit and the exhaust conduit are circular in axial cross-section and co-axial.

8. The energy generating system according to claim 7, further including a generator (28) coupled to the turbine rotor.

9. An energy generating system (10) including:

a compressor or a blower;

a first conduit (14) that:

extends from the compressor or the blower;

defines:

a first conduit inlet; and a first conduit outlet (14*a*); and receives air from the compressor or the blower via the first conduit inlet, conveys the air received from the compressor or the blower along the first conduit and discharges the air received from the compressor or the blower via the first conduit outlet;

a turbine rotor (22);

a turbine housing (20) radially surrounding the turbine rotor; and an exhaust conduit (18) that extends from the turbine housing and defines an exhaust conduit outlet axially spaced from the first conduit outlet, characterised in that:

the turbine housing and the first conduit together define an annular gap (24) therebetween;

the turbine rotor is:

disposed within the annular gap defined between the turbine housing and the first conduit; and rotatably secured to the first conduit;

a first axial end (20*a*) of the turbine housing and the first conduit defines an annular inlet operatively upstream of the turbine rotor;

ambient air operably enters the annular gap defined between the turbine housing and the first conduit via the annular inlet; and the exhaust conduit conveys both:

the ambient air that entered the annular gap defined between the turbine housing and the first conduit; and the air from the compressor or the blower that is discharged from the first conduit outlet, along the exhaust conduit, discharging such conveyed air via the exhaust conduit outlet.

\* \* \* \* \*